Aug. 6, 1968 A. JENSEN 3,395,446

VOLTAGE CONTROLLED SWITCH

Filed Feb. 24, 1965

United States Patent Office 3,395,446

Patented Aug. 6, 1968

3,395,446

VOLTAGE CONTROLLED SWITCH

Arne Jensen, Havnberg, Als, Denmark, assignor to Danfoss A/S, Nordborg, Denmark, a company of Denmark Filed Feb. 24, 1965, Ser. No. 435,019
Claims priority, application Germany, Feb. 24, 1964, D 43,710
5 Claims. (Cl. 29—577)

The present invention relates to an electrically controlled solid state switch and more particularly to a switch using two terminal solid state elements capable of rapid controlled switching, connected to prevent interference between the load circuit and the control circuit.

The elements used in the switch of the present invention utilize solid state switching elements which have the characteristic that they change their resistance from that of a high resistance value, in the order of up to several megohms, to one of low resistance value, in the order of an ohm or even less, when a predetermined switching threshold voltage connected thereacross, is exceeded. The switching threshold voltage is chosen to be greater than that of the line voltage. Thus, with only line voltage applied, the switch will remain in its high value of resistance, or switched OFF condition. A trigger potential such as a pulse, which is greater than the switching threshold voltage and thus greater than the line voltage is applied across the element to change it to its low resistance, conducting condition. Such a pulse may, however, cause damage in the remainder of the circuit to which the element is connected.

It is an object of the present invention to provide an electrically voltage controlled switch in which means are provided to prevent interference of the source supplying control pulses to the switch, with the circuit carrying the load current.

In accordance with the present invention, the path of current supplying the switching pulse is so chosen that an additional solid state element, in its switched OFF, or high resistance condition, blocks the pulse from a path through the load or its power source therefor.

The circuit of the present invention, and the elements for use therein, are particularly useful in arrangements in which a low resistance path is formed in the element rather than where the entire element becomes electrically conductive.

Polycrystalline solid state switching elements will not become conductive over their entire body, but only over a path within the body itself, which path will conduct the major portion of the load current. This path is at random within the body, and apparently is newly formed each time that the device is switched ON. When the control impulse is applied directly over the same electrodes as the ones which carry the major load current, then assurance is provided that the major load current will find a path of low resistance, as determined by the control pulse. This, however, makes it difficult to isolate the load current network from the control pulse network. If it is desired to apply control pulses over an auxiliary, or gate or starting electrode, located close to the main current carrying electrode, the current path established by the gate or auxiliary electrode, and the current path from the main electrode through the polycrystalline body will not be the same.

The switch according to the present invention also solves this problem. The path formed by the control impulse through the polycrystalline body will be identical with the current path taken by the load current. In this connection, it is also possible to form the electrode which carries only control potential in such a way that it is only capacitatively coupled with the solid state body, and not galvanically connected thereto. Thus, isolation between the pulse source and the load current circuit is assured.

A particularly interesting device for use in connection with solid state switch elements useful in the invention is made from tellurium, with additives taken from Groups IV and V of the Periodic Table of Elements. The base substance is polycrystalline. These switches are absolutely symmetrical, have high current carrying capacity, and are easily manufactured. Their switching threshold potential can readily be changed by choice of the relative ratio of components, or by appropriate choice of the thickness of the body. As an example, a solid state switch may consist of approximately 67.5% tellurium, 25% arsenic, and 7.5% germanium or silicon, made by vapor deposition, evaporation, or sputtering-on, on a metal plate, by sintering, or by solidification of an alloy melt.

It is preferred to make such elements by forming an amorphous, glassy layer on a metal plate. Single crystals also are useful, but not as effective. The layer may have a thickness in the order of microns.

The action of the switch upon application of a potential is not entirely understood; it appears, however, that the substances applied to the metal plate have a negative temperature coefficient and are semiconductive. They also have comparatively low heat conductivity. It appears that when a voltage is applied heat loss of the resulting small current will cause a decrease in resistance between an applied electrode and the metal substrate; because of the negative temperature coefficient characteristic, a path of lower resistance will be formed, causing more current to flow, thus, because of the resulting increase in temperature at the particular path, still further decreasing its resistance, and so on. This effect becomes cumulative until saturation is reached.

An experimental device in which the above-mentioned materials were vapor deposited on a metal plate, showed, with various body thicknesses, threshold potentials of ten to one hundred volts; the final voltage drop across the device when it was switched ON, irrespective of the current, was approximately 1 to 1.5 volts. It does not, however, appear that it is necessary for successful operation to have such a path, or channel of electrical conduction between electrodes; it merely appears that as presently understood, this is the best possible theoretical explanation for the operation.

A pair or more of such solid state switch elements can be arranged as a single unit on a common metal plate, or substrate, forming a common electrode. Each of the elements can be switched separately; yet a combined assembly is entirely possible, simplifying the connection to the common terminal over that of several physically separate elements.

An electrode may be applied to the body directly such as by sputtering-on, or evaporating-on the body a conductive layer and then soldering a terminal wire thereto. A capacitatively coupled electrode may be applied by either forming a thin insulating oxide layer on the body of tellurium and its additives, or by applying a thin mica-plate thereon, and securing an electrode against the oxide layer or the mica-plate as the case may be.

According to another embodiment of the present invention, solid state switch elements applied to a common substrate are separated from each other by a crevice, which may be formed, for example, by a scratch mark across the layer of semiconductive material. Because of edge effects occurring at the scratch mark, switching of this device can be readily accomplished while at the same time providing effectively for isolation between the trigger circuit and the load circuit.

Other devices than the above-mentioned polycrystalline elements may be used; for example, silicon controlled rectifiers, or silicon controlled switches, that is multi-layer diodes, may be used. In their commercial form, these multi-layer diodes require the application of a triggering potential and have separate trigger or gate electrodes. The circuits according to the present invention do not require the use of a separate trigger or gate electrode, or a connection thereto. If these devices are used, the trigger or gate electrodes may be left blank or unconnected.

The structure, organization and operation of the invention will now be described more specifically in the following detailed description with reference to the accompanying drawings, in which.

Figure 1:
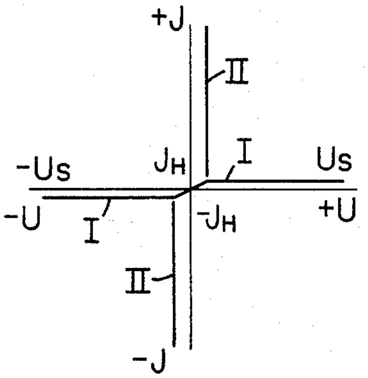
FIG. 1 is a typical voltage (abscissa) vs. current—(ordinate) diagram for a solid state switching element for use in the switch according to the present invention.

FIG. 1 shows, diagrammatically, a current J through a symmetrical solid state switching element, having a voltage U applied thereacross. Below the threshold potential $\pm U_S$, the current is practically zero since the element is in its high resistance state, in which its resistance is up to several megohms (Curve I). As soon as the switching threshold potential $U_S$ is exceeded, the switching element changes to its low resistance state (Curve II), in which its resistance may be one ohm or less. The current through the switch is then essentially determined only by the resistance of the remainder of the circuit. The element remains in the low resistance state until the current therethrough decreases below the holding value $J_H$ which is almost at the zero point. As soon as $J_H$ is passed, the element changes back to its high resistance state.

Five layer diodes or other multi-layer diodes with an odd number of layers show this characteristic. The best results, however, have not been obtained with multi-layer diodes, but with the polycrystalline solid state switching element consisting essentially of tellurium with the additives previously mentioned.

Figure 2:
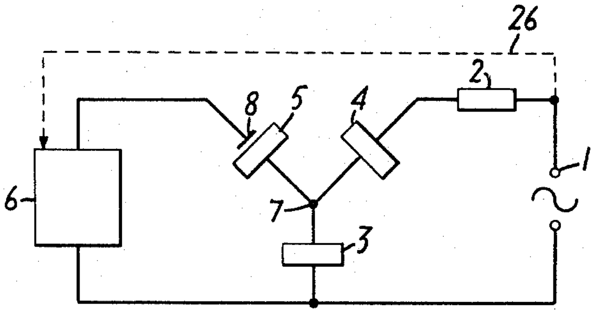
FIG. 2 is a circuit diagram of the switch.

Referring now to FIG. 2: This figure illustrates a source of alternating potential 1, a load in the form of a resistance 2, and serially connected solid state switching elements 3 and 4. The control circuit comprises, besides the solid state switch 3, an additional solid state switch element 5 which is in series therewith, and a pulse or control source 6. Control source 6 is capable of giving pulses, which may be synchronized or phase shifted with respect to the frequency of the AC source 1, as schematically indicated by dashed line 26. The potential of the pulse delivered by unit 6 is larger than twice the threshold potential 5 and 3 of the elements $U_S$. Thus, both solid state switches 3 and 5 will switch to their low resistance state.

As soon as the element 3, which is common to both the control circuit and the load circuit 1, 2, switches into its low resistance state, line voltage will be applied across element 4, at that time, element 4 will likewise switch to its low resistance state, thus completing the circuit through load 2. It is to be noted that when the pulse source 6 emits the starting trigger pulse, element 4 is in its high resistance state. The relative threshold potentials of elements 3 and 4 can be chosen in such a manner that element 3 has a lower threshold potential than element 4, so that element 3 will always switch, thereby effectively isolating pulses from source 6 through the load 2 and source 1, which might occur if element 4 switches first. The three elements 3, 4 and 5 are connected to a common point 7. Element 5 is preferably capacitatively coupled by means of an insulated electrode 8 in order to increase the isolation between the pulse source 6 and the remainder of the circuit.

The threshold potential $U_S$ of the three elements may be the same, and less than the potential of source 1, but greater than half of the potential of source 1. The potential of the pulses emitted by source 6 must be greater than 2 $U_S$.

A new trigger pulse must be furnished by source 6 at each half wave; if the trigger pulse is furnished in phase with the phase of the supply 1, full load current will flow through load 2; by phase shifting the occurrence of the trigger pulse, the effective current can be decreased.

Figure 3:
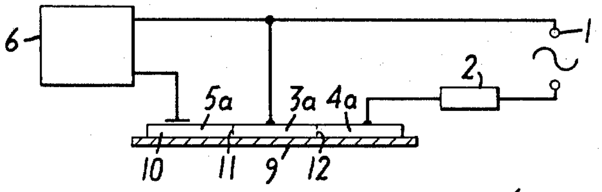
FIG. 3 is a practical form of the switch in a circuit.

FIG. 3 shows a practical form of the present invention, in which a layer 10 of a polycrystalline solid state semiconductor switch material is applied, for example by vapor deposition, on a metal plate 9. The path of current in each instance is limited and substantially a direct line between the electrodes; thus, layer 10 can be thought of as forming three separate elements *3a*, *4a*, *5a*, separated from each other as schematically indicated by dashed lines 11, 12. Plate 9 forms the common connection, and is electrically equivalent to point 7, FIG. 2.

Figure 4:
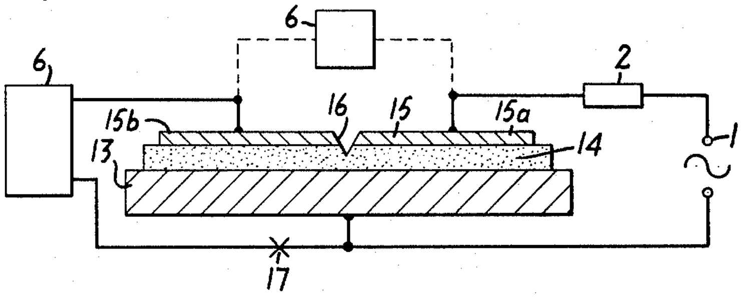
FIG. 4 is another embodiment of a switch in a circuit.

FIG. 4 illustrates a form of the invention in which the common electrical path, indicated in FIG. 2 by terminal 7, is within the solid state semiconductive substance itself. A substrate or metal plate 13 has a layer 14 of solid state switching material applied thereon. An ohmic electrode connection, making a galvanic, non-rectifying contact 15, is applied on top of the layer 14, for example by vapor deposition or evaporation. A crevice or scratch mark 16 is placed across the electrode 15, separating it into two portions, *15a*, *15b*, The layers themselves can be extremely thin, their thickness being in the order of microns. Pulse source 6 is then connected to the substrate 13 and one of the electrode portions, for example *15b* as shown in solid lines; and the power source and load is connected to the other electrode portion, *15a* as shown, and to the substrate 13.

When a trigger pulse is placed between electrode portion *15b* and substrate 13, a current path will be formed in the region of the crevice or scratch 16, which path will be between the electrode portion *15b* and plate 13. It appears, according to present understanding, that the current path will be at the edge because of the greater electrical field existing at that point, or because the homogeneous state of layer 14 is disturbed by the crevice, or by the operation making it. As soon as a low resistance path is formed through layer 14 in the region of crevice 16, a point having full potential from source 1 applied thereon will occur closer to electrode *15a*, than the distance between electrode *15a* and the plate 13. Thus, the layer 14, in the region of the crevice 16, will also switch to its low resistance state entirely between electrode *15a* and plate 13, thus connecting source 2 through a low resistance path.

In FIG. 4, it is also possible to connect the trigger source 6, as shown in dashed lines, between electrodes *15a* and *15b*; in that case, of course, a connection at point 17 will be broken. The operation of the device with this connection apparently is that a low resistance path will be formed around the crevice between electrode portions *15a*, *15b*, thus placing a low resistance path from electrode portion *15a* closer to plate 13 than the normal distance between electrode 15 and plate 13; and again, the element will switch and carry load current in the region of the crevice 16.

The switching arrangement according to the present invention may also be used to connect direct current. The pulse source 6 may supply pulses which are either square wave, sawtooth, sine waves or the like; it may also supply any continuous control potential, or a continuous sine wave which may be phase shifted with respect to the phase of the main supply at 1. Such phase shift elements may be incorporated in the trigger source 6 itself, as is well known in the art. The load may have any electrical impedance characteristic, and may be capacitative, inductive, as well as purely resistive.

Figure 5:
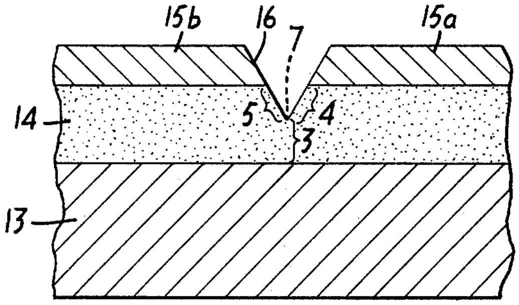
FIG. 5 is a partial, enlarged view of a portion of FIG. 4.

FIG. 5 is an enlarged view of the region of the crevice 16 of FIG. 4. The current paths as they are believed to arise in this figure, are indicated with the same reference numerals as those used in FIG. 2; and the common point, 7, is indicated by a dashed line.

According to the invention, therefore, an electrically voltage controlled switch is provided, which essentially consists of a pair of solid state switching elements 3, 4, which change their resistance from a high resistance value to a low resistance value when a predetermined switching threshold voltage, applied thereacross, is exceeded. The sum of the switching threshold voltages of both of the elements is higher than the potential of the voltage source 1. A switching potential source 6 is provided; this switching potential source is connected through an additional switching element 5 in circuit with one of the pair of elements 3 or 4. As shown in FIG. 2, a common connection 7 is provided and the common element is switch element 3. As shown in FIG. 4, and referring there to the dashed connection of pulse source 6, and to the enlarged view FIG. 5, the solid state switch element common to the load circuit and the pulse source is element 4. Again, the common connection at point 7 is present, in the embodiment of FIGS. 4 and 5, however, not being an electrical, galvanic connection, but occurring within the solid state element itself.

I claim:

1. Method of manufacturing a voltage controlled switch unit on a support plate, comprising applying a polycrystalline layer consisting essentially of tellurium, with additives taken from elements of Groups IV and V of the Periodic Table of Elements to said plate; applying an electrically conductive electrode layer over said polycrystalline layer; and scratching a crevice across said electrode layer, through said electrode layer and penetrating said polycrystalline layer, whereby to separate said electrode layer into electrode portions, and connecting a switching potential to said electrode portions.

2. Method as claimed in claim 1, said layers being applied to have a thickness in the order of microns.

3. Method as claimed in claim 1, at least one of said layers being evaporated on said plate.

4. Method as claimed in claim 1, at least one of said layers being sintered on said plate.

5. Method as claimed in claim 1, at least one of said layers being formed on said plate from a solidified melt.

References Cited

UNITED STATES PATENTS

| | | | |
|---|---|---|---|
| 3,069,297 | 12/1962 | Beale | 29—583 X |
| 3,124,772 | 3/1964 | Newkirk | 29—610 X |
| 3,271,591 | 9/1966 | Ovshinsky | 307—258 |

WILLIAM I. BROOKS, *Primary Examiner.*